(12) United States Patent
Kajihara et al.

(10) Patent No.: US 8,993,647 B2
(45) Date of Patent: Mar. 31, 2015

(54) FOAMS, FOAMING COMPOSITIONS AND APPLICATIONS THEREOF

(75) Inventors: Takayuki Kajihara, Funabashi (JP); Kiminori Noda, Mobara (JP); Masayoshi Yamaguchi, Chiba (JP); Takashi Hakuta, Sodegaura (JP)

(73) Assignee: Mitsui Chemicals, Inc., Tokyo (JP)

(*) Notice: Subject to any disclaimer, the term of this patent is extended or adjusted under 35 U.S.C. 154(b) by 288 days.

(21) Appl. No.: 12/227,293

(22) PCT Filed: May 10, 2007

(86) PCT No.: PCT/JP2007/059665
§ 371 (c)(1),
(2), (4) Date: Nov. 13, 2008

(87) PCT Pub. No.: WO2007/132731
PCT Pub. Date: Nov. 22, 2007

(65) Prior Publication Data
US 2009/0126234 A1    May 21, 2009

(30) Foreign Application Priority Data
May 17, 2006    (JP) ................................. 2006-137420

(51) Int. Cl.
| | | |
|---|---|---|
| C08J 9/10 | (2006.01) | |
| C08J 9/06 | (2006.01) | |
| C08L 47/00 | (2006.01) | |
| A43B 13/04 | (2006.01) | |
| A43B 13/18 | (2006.01) | |
| A43B 13/38 | (2006.01) | |
| C08J 9/38 | (2006.01) | |
| A43B 17/14 | (2006.01) | |
| C08J 9/00 | (2006.01) | |
| C08L 23/08 | (2006.01) | |
| C08L 23/16 | (2006.01) | |
| B32B 9/02 | (2006.01) | |
| B32B 9/04 | (2006.01) | |
| B32B 25/04 | (2006.01) | |
| B32B 27/06 | (2006.01) | |
| B32B 27/40 | (2006.01) | |

(52) U.S. Cl.
CPC . *C08J 9/38* (2013.01); *A43B 13/04* (2013.01); *A43B 17/14* (2013.01); *C08J 9/0061* (2013.01); *C08L 23/0815* (2013.01); *C08L 23/0846* (2013.01); *C08L 23/16* (2013.01); *B32B 9/025* (2013.01); *B32B 9/046* (2013.01); *B32B 25/045* (2013.01); *B32B 27/065* (2013.01); *B32B 27/40* (2013.01); *C08J 2201/024* (2013.01); *C08J 2323/08* (2013.01); *C08J 2423/00* (2013.01); *B32B 2437/02* (2013.01)
USPC ............. 521/140; 521/94; 525/240; 36/30 R; 36/44

(58) Field of Classification Search
USPC ................ 521/140, 94; 525/240; 36/30 R, 44
See application file for complete search history.

(56) References Cited

U.S. PATENT DOCUMENTS

| | | | |
|---|---|---|---|
| 5,387,620 A | 2/1995 | Park et al. | |
| 5,922,823 A * | 7/1999 | Sagane et al. | 526/336 |
| 6,617,366 B2 * | 9/2003 | Sueda et al. | 521/142 |
| 6,743,862 B2 | 6/2004 | Hakuta et al. | |
| 7,189,763 B2 * | 3/2007 | Sueda et al. | 521/96 |
| 2002/0143077 A1 | 10/2002 | Sueda et al. | |
| 2002/0183408 A1 * | 12/2002 | Sueda et al. | 521/59 |
| 2003/0207952 A1 * | 11/2003 | Sueda et al. | 521/50 |
| 2005/0288440 A1 | 12/2005 | Chou et al. | |
| 2006/0154998 A1 * | 7/2006 | Shiba et al. | 521/142 |
| 2009/0100704 A1 | 4/2009 | Kajihara et al. | |

FOREIGN PATENT DOCUMENTS

| | | | |
|---|---|---|---|
| EP | 0 997 493 A1 | 5/2000 | |
| EP | 1 229 076 A1 | 8/2002 | |
| EP | 1 388 570 A2 | 2/2004 | |
| EP | 1 391 293 A1 | 2/2004 | |
| EP | 1 642 930 A1 | 4/2006 | |
| EP | 1 880 625 | 1/2008 | |
| EP | 1 908 795 A1 | 4/2008 | |
| JP | 06-107840 | 4/1994 | |
| JP | 9-501447 | 2/1997 | |
| JP | 10-036579 | 2/1998 | |
| JP | 11-005818 | 1/1999 | |
| JP | 11-206406 | 8/1999 | |
| JP | 2001-139740 | 5/2001 | |
| JP | 2004-315619 | 11/2004 | |
| TW | 583249 | 4/2004 | |
| WO | WO 2005/000958 | * 1/2005 | C08L 23/08 |

OTHER PUBLICATIONS

International Search Report in PCT/JP2007/059665 dated Jul. 24, 2007.
Supplementary EP Search Report in EP Appln No. 07 74 3100 dated Jun. 22, 2010.
Office Action in TW Appln No. 96117536 dated Feb. 9, 2011.

* cited by examiner

*Primary Examiner* — Kara Boyle
(74) *Attorney, Agent, or Firm* — Foley & Lardner LLP

(57) ABSTRACT

[Objects] It is an object to provide a foam having a low specific gravity and a small compression set, more preferably a foam having a low specific gravity, a small compression set and uniform quality, a foaming composition, and applications of the foam.
[Means for Solution] The foam is obtained by foaming an olefin polymer, wherein the foam has a specific gravity (d) in the range of 0.03 to 0.30, and a compression set (CS, %) and the specific gravity (d) satisfy the formula of $CS \leq -279 \times (d) + 95$. The foam is preferably obtained from a foaming composition that includes an ethylene polymer (A) including a specific ethylene/$\alpha$-olefin copolymer (A1) and an ethylene/polar monomer copolymer (A2) in a specific mass ratio, and a specific ethylene/C3-20 $\alpha$-olefin/non-conjugated polyene copolymer (B).

16 Claims, 1 Drawing Sheet

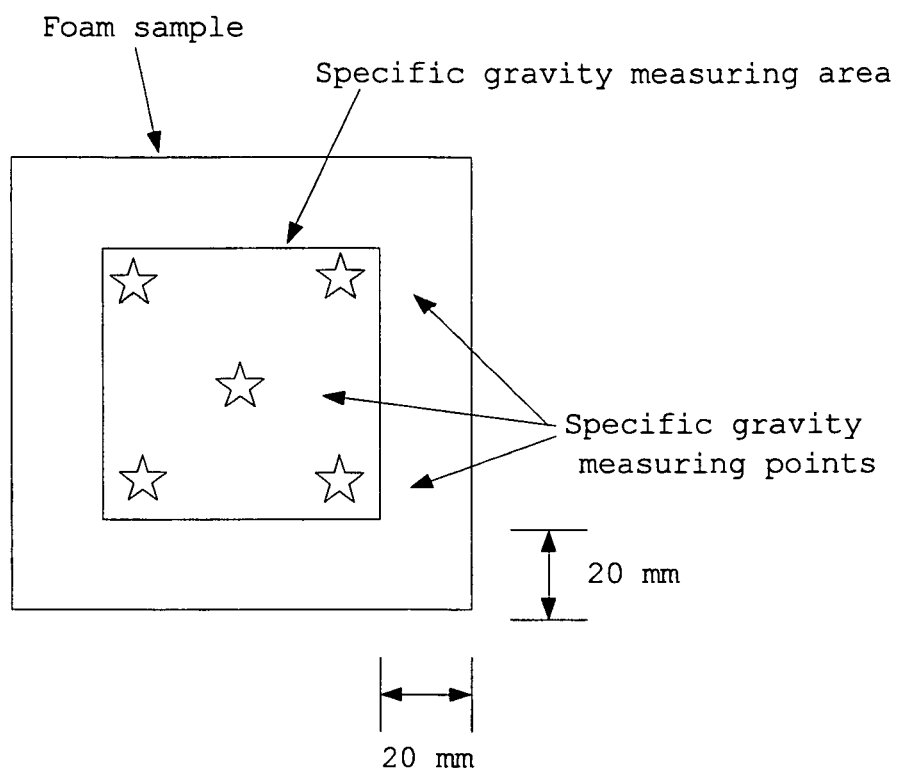

FOAMS, FOAMING COMPOSITIONS AND APPLICATIONS THEREOF

TECHNICAL FIELD

The present invention relates to foams, foaming compositions, and applications thereof. More specifically, the present invention relates to foams having a low specific gravity, a small compression set (CS) and in a preferred mode a uniform quality, and to applications of the foams. Moreover, the present invention relates to compositions capable of providing foams having a low specific gravity, a small compression set (CS) and preferably a uniform quality.

BACKGROUND ART

Crosslinked foams have a low specific gravity, namely are lightweight, and have flexibility and high mechanical strength. They have been widely used for interior and exterior materials of construction, automobile components such as interior materials and door glass run channels, packaging materials, and daily necessities. Merely foaming a resin provides lightweight but results in a foam having low mechanical strength. It is thus publicly known that molecular chains in the foam are linked to each other by crosslinking reaction of the resin to prevent mechanical strength from being decreased.

Crosslinked foams made of resin find use in footwear and footwear components such as shoe soles (mainly mid soles) of sport shoes and the like. The reason for this use is that footwear and footwear components are required to meet conditions such as lightness in weight, resistance to deformation by long use, and mechanical strength and impact resilience to withstand use under severe conditions.

It is widely known that crosslinked foams made of ethylene/vinyl acetate copolymers have been used for shoe soles. However, crosslinked foams molded from compositions of ethylene/vinyl acetate copolymers have a high specific gravity and a large compression set. In the case in which the crosslinked foam is used for a shoe sole, the shoe sole is heavy and is compressed after long use, and mechanical strength such as impact resilience is decreased disadvantageously.

Patent documents 1 and 2 describe a crosslinked foam using an ethylene/α-olefin copolymer and a crosslinked foam using a mixture of an ethylene/vinyl acetate copolymer and an ethylene/α-olefin copolymer, respectively. These inventions improve low specific gravity and compression set. However, a satisfactory performance cannot be obtained.

Patent document 3 describes an ethylene/α-olefin/specified non-conjugated polyene random copolymer. However, a study by the present inventors has found that there is room for improvement in terms of providing a foam having a low specific-gravity, a small compression set (CS) and a uniform quality.

Patent document 4 describes an olefin crosslinked foam and a composition therefor. However, a study by the present inventors has found that there is room for improvement in terms of providing a foam having a lower specific gravity and a smaller compression set.

Patent document 5 describes an elastomer composition for a crosslinked foam and applications thereof. However, a study by the present inventors has found that there is room for improvement in terms of providing a foam having a low specific gravity and a small compression set (CS).

Patent document 1: Japanese Unexamined Patent Application Publication No. 9-501447
Patent document 2: Japanese Patent Application Laid-Open Publication No. 11-206406
Patent document 3: Japanese Patent Application Laid-Open Publication No. 11-5818
Patent document 4: EP 997493
Patent document 5: EP 1229076

DISCLOSURE OF THE INVENTION

Problems to be Solved by the Invention

It is an object of the present invention to provide a foam having a low specific gravity and a small compression set, more preferably a foam having a low specific gravity, a small compression set and a uniform quality, and applications of the foam. Another object of the present invention is to provide a foaming composition capable of giving a foam having a low specific gravity, a small compression set and a uniform quality.

Means for Solving the Problems

The inventors diligently studied to solve the above problems. As a result, the inventors have found a foam and a foaming composition which have a low specific gravity, a small compression set and a uniform quality. The present invention has been completed based on the finding.

The present invention can be specified by the items described in the following [1] to [16].

[1] A foam obtained by foaming an olefin polymer, wherein the foam has a specific gravity (d) in the range of 0.03 to 0.30, and a compression set (CS, %) and the specific gravity (d) satisfies the following formula:

$$CS \leq -279 \times (d) + 95.$$

[2] The foam as defined in above [1], wherein the foam is a crosslinked foam.

[3] The foam as defined in above [1] or [2], wherein the olefin polymer comprises an ethylene polymer (A) selected from an ethylene/α-olefin copolymer (A1) and an ethylene/polar monomer copolymer (A2), and an ethylene/C3-20 α-olefin/non-conjugated polyene copolymer (B).

[4] The foam as defined in any one of above [1] to [3], wherein the foam is obtained from an ethylene polymer composition comprising an ethylene polymer (A) in an amount of more than 80 mass % to 99 mass % and an ethylene/C3-20 α-olefin/non-conjugated polyene copolymer (B) in an amount of 1 mass % to less than 20 mass % (the sum of (A) and (B) is 100 mass %);

the component (A) comprising (A1) an ethylene/α-olefin copolymer in which (a1) a density (ASTM D1505, 23° C.) is in the range of 0.857 to 0.910 g/cm$^3$ and (a2) a melt flow rate (MFR2) (ASTM D1238, a load of 2.16 kg, 190° C.) is in the range of 0.1 to 40 g/10 minutes at a load of 2.16 kg and at 190° C., and (A2) an ethylene/polar monomer copolymer in a mass ratio of (A1)/(A2)=100/0 to 20/80; and the component (B) satisfying the conditions in which (b1) a ratio (Et/α) of a content (Et, mole %) of constitutional units derived from ethylene and a content (α, mole %) of constitutional units derived from the C3-20 α-olefin is in the range of 50/50 to 80/20, (b2) an iodine value is in the range of 0.5 to 50 (g/100 g), and (b3) a Mooney viscosity (ML$_{1+4}$ (100° C.)) (JIS K6395) is in the range of 1 to 200.

[5] An ethylene polymer composition comprising (A) an ethylene polymer in an amount of more than 80 mass % to 99 mass % and (B) an ethylene/C3-20 α-olefin/non-conjugated polyene copolymer in an amount of 1 mass % to less than 20 mass % (the sum of (A) and (B) is 100 mass %) wherein:

the component (A) comprises (A1) an ethylene/α-olefin copolymer in which (a1) a density (ASTM D1505, 23° C.) is in the range of 0.857 to 0.910 g/cm$^3$ and (a2) a melt flow rate (MFR2) (ASTM D1238, a load of 2.16 kg, 190° C.) is in the range of 0.1 to 40 g/10 minutes at a load of 2.16 kg and at 190° C., and (A2) an ethylene/polar monomer copolymer in a mass ratio of (A1)/(A2)=100/0 to 20/80; and the component (B) satisfies the conditions in which (b1) a ratio (Et/α) of a content (Et, mole %) of constitutional units derived from ethylene and a content (α, mole %) of constitutional units derived from the C3-20 α-olefin is in the range of 50/50 to 80/20, (b2) an iodine value is in the range of 0.5 to 50 (g/100 g), and (b3) a Mooney viscosity ($ML_{1+4}$ (100° C.)) (JIS K6395) is in the range of 1 to 200.

[6] The ethylene polymer composition as defined in above [5], wherein the composition further comprises a foaming agent (C).

[7] The ethylene polymer composition as defined in above [5] or [6.], wherein the composition further comprises a radical generator (D).

[8] The ethylene polymer composition as defined in any one of above [5] to [7], wherein the composition further comprises a crosslinking assistant (E).

[9] The ethylene polymer composition as defined in any one of above [5] to [8], wherein a mass ratio [(E)/(D)] of the crosslinking assistant (E) and the radical generator (D) is in the range of 1/30 to 5/1.

[10] The ethylene polymer composition as defined in any one of above [5] to [9], wherein the ethylene polymer composition is a foaming composition.

[11] A method for manufacturing a foam, comprising the step of:

heating an ethylene polymer composition comprising (A) an ethylene polymer in an amount of more than 80 mass % to 99 mass % and (B) an ethylene/C3-20 α-olefin/non-conjugated polyene copolymer in an amount of 1 mass % to less than 20 mass % (the sum of (A) and (B) is 100 mass %) wherein:

the component (A) comprises (A1) an ethylene/α-olefin copolymer in which (a1) a density (ASTM D1505, 23° C.) is in the range of 0.857 to 0.910 g/cm$^3$ and (a2) a melt flow rate (MFR2) (ASTM D1238, a load of 2.16 kg, 190° C.) is in the range of 0.1 to 40 g/10 minutes at a load of 2.16 kg and at 190° C., and (A2) an ethylene/polar monomer copolymer in a mass ratio of (A1)/(A2)=100/0 to 20/80; and the component (B) satisfies the conditions in which (b1) a ratio (Et/α) of a content (Et, mole %) of constitutional units derived from ethylene and a content (α, mole %) of constitutional units derived from the C3-20 α-olefin is in the range of 50/50 to 80/20, (b2) an iodine value is in the range of 0.5 to 50 (g/100 g), and (b3) a Mooney viscosity ($ML_{1+4}$ (100° C.)) (JIS K6395) is in the range of 1 to 200.

[12] The method for manufacturing a foam as defined in above [11], further comprising the step of compression-molding the foam obtained by heating the ethylene polymer composition.

[13] A laminate comprising:

a layer comprising the foam as defined in any one of above [1] to [4]; and a layer comprising at least one material selected from the group consisting of polyolefin, polyurethane, rubber, leather and synthetic leather.

[14] Footwear comprising the foam as defined in any one of above [1] to [4] or the laminate as defined in above [13].

[15] A footwear component comprising the foam as defined in any one of above [1] to [4] or the laminate as defined in above [13].

[16] The footwear component as defined in above [15], which is a mid sole, an inner sole or a sole.

Advantages of the Invention

The foams according to the present invention have a low specific gravity and a small compression set, and have a uniform quality. The ethylene polymer compositions according to the present invention give foams having a low specific gravity and a small compression set, and foams having a uniform quality. The foams according to the present invention can be suitably used for footwear and footwear components in particular.

BRIEF DESCRIPTION OF THE DRAWING

FIG. 1 is a schematic view showing a specific gravity measuring area and five specific gravity measuring points (represented by star marks) on one plane of a foam sample, wherein the specific gravity measuring is found at least 20 mm inward from the four sides of the plane of the foam sample.

BEST MODE FOR CARRYING OUT THE INVENTION

The foams, foaming compositions and applications thereof according to the present invention will be described below in detail.

The foam according to the present invention can be obtained from an olefin polymer, preferably from a foaming composition.

The foam according to the present invention is obtained by at least foaming an olefin polymer or a foaming composition. The foam is generally crosslinked. However, it is not always necessary that the foam is crosslinked. Hereafter, foams that are crosslinked will be referred to as crosslinked foams, and foams that are not crosslinked will be referred to as non crosslinked foams.

The ethylene polymer composition according to the present invention includes:

(A) an ethylene polymer and (B) an ethylene/C3-20 α-olefin/non-conjugated polyene copolymer, and if necessary:

(C) a foaming agent, (D) a radical generator, and (E) a crosslinking assistant.

The above component (A) includes:

(A1) an ethylene/α-olefin copolymer and (A2) an ethylene/polar monomer copolymer, wherein (A1) and (B) satisfy the specified requirements (a1), (a2), (b1), (b2), and (b3) described later.

More specifically, the ethylene polymer composition according to the present invention includes:

(A) an ethylene polymer in an amount of more than 80 mass % to 99 mass %, the ethylene polymer including:
 (A1) an ethylene/α-olefin copolymer that satisfies (a1) and (a2) described later; and
 (A2) an ethylene/polar monomer copolymer in a mass ratio of (A1)/(A2)=100/0 to 20/80; and (B) an ethylene/C3-20 α-olefin/non-conjugated polyene copolymer in an amount of 1 mass % to less than 20 mass % (the sum of (A) and (B) is 100 mass %), which copolymer satisfies (b1), (b2) and (b3) described later.

<Foam>

The foam according to the present invention satisfies the following (i) and (ii), and preferably (iii) and/or (iv).

(i) The specific gravity (d) is in the range of 0.03 to 0.30, preferably in the range of 0.05 to 0.20, more preferably in the range of 0.05 to 0.12, further preferably in the range of 0.08 to 0.12. The specific gravity within the upper limit gives good impact resilience and is preferable in terms of weight reduction of the foam. The specific gravity not less than the lower limit promises sufficient strength and good durability of the foam. The uniformity of quality of the foam is measured based on specific gravity at five points of the foam. In the invention, the difference between the maximum and minimum values of the five points is preferably not more than 0.08, more preferably not more than 0.06.

(ii) It is preferable that the compression set (CS, %) and the specific gravity (d) satisfy the following formula.

$$CS \leq -279 \times (d) + 95$$

When CS is not more than −279×(d)+95, the foam shows good relaxation of compression stress. Such foam is effective for applications that require permanent set resistance.

Although the satisfaction of the above formula is desirable, the compression set (CS) of the foam is preferably 10% or higher, more preferably 25% or higher.

(iii) It is preferable that the impact resilience is 30% or higher, more preferably 40% or higher. The foam with high impact resilience has a soft touch sense and shows excellent cushioning properties when used in footwear.

(iv) It is preferable that the tearing strength of the foam measured according to ASTM D3574 is from 1.5 N/mm to 5.0 N/mm, more preferably from 2.0 N/mm to 4.5 N/mm. With this tearing strength, the foam may be bonded to other members to achieve sufficient bond strength.

Here, the above physical properties are measured as follows.

(i) Specific Gravity

The specific gravity was measured according to JIS K7222. In the case of a cube foam, a sample is sampled from an area that is found at least 20 mm inward from the four sides of the largest plane and at least 2.5 mm deep from the surface of the plane and the surface of a plane parallel thereto. This sampling location applies to sample foams with other various shapes. Specifically, a sample is sampled from an area that is found at least 20 mm inward from the edges (sides) of the opposed largest planes as upper and lower surfaces and at least 2.5 mm deep from the upper and lower surfaces.

In the case in which the foam is used for a mid sole, a sample is prepared from an area found at least 20 mm inward from the edges and at least 2.5 mm deep from the approximately parallel planes.

The specific gravity is measured at five points in the foam and the results are averaged. The specific gravity at five points of the foam determines the uniformity of quality of the foam. In the invention, the difference between the maximum and minimum values of the five points is preferably not more than 0.08, more preferably not more than 0.06. The difference by more than 0.08 means that the quality of the product (e.g., hardness, mechanical properties and compression set) is not uniform. FIG. 1 shows five points for measurement.

(ii) Compression Set (CS)

The compression set (CS) is measured according to JIS K6262. A foam is cut in a cylindrical shape with a diameter of 30 mm and a thickness of at least 15 mm, and a sample is prepared by cutting the cylinder to a thickness of 10 mm by eliminating at least 2.5 mm from the two parallel faces of the cylinder.

This sample preparation applies to sample foams with other various shapes. Specifically, a foam is cut in a cylindrical shape with a diameter of 30 mm and a thickness of at least 15 mm, and a sample is prepared by cutting the cylinder to a thickness of 10 mm by eliminating at least 2.5 mm from the two parallel faces of the cylinder.

A cylindrically hollow dumbbell implement may be used for cutting the foam in a cylindrical shape or for sampling the sample from under the parallel planes of the foam.

The sample is left at rest in the environment of 50% compression and 50° C. for 6 hours. The thickness is measured 30 minutes after the sample is released from the compression. The compression set (CS) is calculated by the following formula.

$$CS = (t0 - t1)/(t0 - t2) \times 100$$

t0: Initial sample thickness (mm)
t1: Thickness (mm) measured 30 minutes after the sample is removed from compression apparatus
t2: Spacer thickness (mm)

(iii) Impact Resilience

The impact resilience was measured according to JIS K6255. A sample is prepared by the same method as used in the above (2) Compression set (CS). The impact resilience was measured in the atmosphere of 23° C.

(iv) Tearing Strength

The tearing strength was measured according to ASTM D3574 in the environment of 23° C. A tensile tester is used as a testing machine, and the stress rate is 100 mm/min. The tearing strength Tr (N/mm) is calculated by the following formula.

$$Tr = t0/t1 \times 9.81$$

t0: Tearing stress (kg)
t1: Sample width (mm)

The foam according to the present invention can be obtained by foaming an olefin polymer.

The olefin polymer according to the present invention is at least one polymer which includes constitutional units derived from an α-olefin of 2 to 20 carbon atoms.

The polymer including constitutional units derived from a C2-20 α-olefin is not particularly limited. For instance, the polymer may be an ethylene/C3-20 α-olefin copolymer, or may be an ethylene/C3-20 α-olefin/non-conjugated polyene copolymer. Moreover, the polymer may be a copolymer of a C2-20 α-olefin and a polar monomer. The polymer may be a mixture of a plurality of polymers.

Preferable examples of the ethylene/C3-20 α-olefin copolymers include the ethylene polymer (A1). Preferable examples of the C2-20 α-olefin/polar monomer copolymers include the ethylene/polar monomer copolymer (A2). Preferable examples of the ethylene/C3-20 α-olefin/non-conjugated polyene copolymers include the ethylene/polar monomer copolymer (B).

More preferably, the foam may be obtained from a composition that includes: an ethylene polymer (A) (described later) in an amount of more than 80 mass % to 99 mass %, which polymer includes an ethylene/α-olefin copolymer (A1) that satisfies (a1) and (a2) and an ethylene/polar monomer copolymer (A2) in a mass ratio of (A1)/(A2)=100/0 to 20/80; and an ethylene/C3-20 α-olefin/non-conjugated polyene copolymer (B) (described later) in an amount of 1 mass % to less than 20 mass % (the sum of (A) and (B) is 100 mass %), which copolymer satisfies (b1) to (b3).

More preferably, the foam may be obtained from a composition including the ethylene polymer (A) in an amount of 81 to 99 parts by mass, preferably 81 to 96 parts by mass, more preferably 82 to 94 parts by mass, and the ethylene/α-olefin/non-conjugated polyene copolymer (B) in an amount of 1 to 19 parts by mass, preferably 4 to 19 parts by mass, more preferably 6 to 18 parts by mass (the sum of (A) and (B) is 100 parts by mass).

The foam according to the present invention may be produced by any methods without limitation, for example by a method that will be described layer in "Method for manufacturing foam". The olefin polymer may be foamed optionally together with (C) a foaming agent, (D) a radical generator, (E) a crosslinking assistant, and various additives such as a filler, a heat stabilizer, a weathering stabilizer, a flame retardant, a hydrochloric acid absorber and a pigment (these may be added while still achieving the objects of the present invention). The olefin polymer is preferably an ethylene polymer composition described below.

<Ethylene Polymer Composition>

The ethylene polymer composition according to the present invention includes the ethylene polymer (A) in an amount of more than 80 to 99 mass %, preferably 81 to 99 mass %, preferably 81 to 96 mass %, more preferably 82 to 94 mass %, and the ethylene/α-olefin/non-conjugated polyene copolymer (B) in an amount of 1 to less than 20 mass %, preferably 1 to 19 parts by mass, preferably 1 to 16 mass %, more preferably 2 to 14 mass % (the sum of (A) and (B) is 100 parts by mass). When these amounts are satisfied, the composition gives a foam with particularly high uniformity of quality.

The following describes the components (A1), (A2) and (B) in detail.

<(A1) Ethylene/α-olefin Copolymer>

The ethylene/α-olefin copolymer (A1) according to the present invention is an amorphous or low crystalline, random or block copolymer composed of ethylene and an α-olefin of 3 to 20 carbon atoms. The copolymer satisfies the following (a1) and (a2). (a1): The density (ASTM D1505) of the ethylene/α-olefin copolymer is in the range of 0.857 to 0.910 g/cm$^3$, preferably in the range of 0.860 to 0.905 g/cm$^3$. (a2): The melt flow rate (MFR; ASTM D1238, 190° C., a load of 2.16 kg) is in the range of 0.1 to 40 g/10 minutes, preferably in the range of 0.5 to 20 g/10 minutes.

The α-olefin copolymerized with ethylene is an α-olefin of 3 to 20 carbon atoms. Examples include propylene, 1-butene, 1-pentene, 1-hexene, 1-heptene, 1-octene, 1-nonene, 1-decene, 1-undecene, 1-dodecene, 1-hexadecene, 1-octadecene, 1-nonadecene, 1-eicosene and 4-methyl-1-pentene. Among them, the α-olefins with 3 to 10 carbon atoms are preferable. In particular, propylene, 1-butene, 1-hexene, and 1-octene are preferable. The α-olefins can be used singly or two or more kinds may be used in combination.

It is preferable that the ethylene/α-olefin copolymer (A1) includes constitutional units derived from ethylene in the range of 75 to 95 mole %, preferably in the range of 80 to 95 mole %, and constitutional units derived from the C3-20 α-olefin(s) in the range of 5 to 25 mole %, preferably in the range of 5 to 20 mole %. Here, the total content of ethylene and the α-olefin(s) is 100 mole %.

In addition to the above constitutional units, the ethylene/α-olefin copolymer (A1) may contain constitutional units derived from other polymerizable monomers while still achieving the advantages of the present invention.

Examples of the ethylene/α-olefin copolymers (A1) include ethylene/propylene copolymer, ethylene/1-butene copolymer, ethylene/propylene/1-butene copolymer, ethylene/propylene/ethylidenenorbornene copolymer, ethylene/1-hexene copolymer, and ethylene/1-octene copolymer. Among them, ethylene/propylene copolymer, ethylene/1-butene copolymer, ethylene/1-hexene copolymer, and ethylene/1-octene copolymer are preferably used. In particular, ethylene/1-butene copolymer is preferably used. These copolymers are random or block copolymers. In particular, it is preferable that these copolymers are random copolymers.

For the ethylene/α-olefin copolymer (A1), (a3) the degree of crystallinity by X-ray diffractometry is generally 40% or less, preferably in the range of 10% to 30%.

For the ethylene/α-olefin copolymer (A1), (a4) the melting point measured with a differential scanning calorimeter (DSC) is generally 110° C. or less, or a melting point is not observed. Preferably, the melting point is 105° C. or less, or a melting point is not observed.

For the DSC measurement, approximately 10 mg of a sample is packed into an aluminum pan, (i) the sample is heated to 200° C. at 100° C./min and held at 200° C. for 5 minutes, (ii) the sample is cooled to −150° C. at 10° C./min, and (iii) the sample is heated to 200° C. at 10° C./min. A temperature of an endothermic peak observed in (iii) is a melting point Tm.

For the ethylene/α-olefin copolymer. (A1), (a5) the molecular weight distribution (Mw/Mn) obtained by gel permeation chromatography (GPC) is preferably in the range of 1.5 to 3.0, more preferably in the range of 1.7 to 2.5. When the ethylene/α-olefin copolymer (A1) has this molecular weight distribution (Mw/Mn), the composition can give a foam excellent in compression set and shaping properties. The ethylene/α-olefin copolymer (A1) generally shows elastomeric properties.

For the ethylene/α-olefin copolymer (A1) according to the present invention, (a6) the intensity ratio (Tαβ/Tαα) of Tαβ to Tαα in a $^{13}$C-NMR spectrum is preferably 0.5 or less, preferably 0.4 or less.

Here, Tαα and Tαβ in a $^{13}$C-NMR spectrum are peak intensities of $CH_2$ in the constitutional units derived from the α-olefin of 3 or more carbon atoms. They represent two kinds of $CH_2$ at different positions relative to the tertiary carbon as shown in the following chemical formula.

[Chemical formula 1]

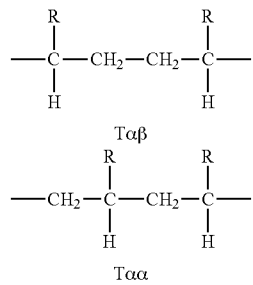

The Tαβ/Tαα intensity ratio can be obtained as described below. A $^{13}$C-NMR spectrum of the ethylene/α-olefin copolymer is measured using JEOL-GX270 NMR measuring apparatus manufactured by JEOL, Ltd. The measurement is carried out using a 5 mass % solution of a sample in hexachlorobutadiene/d6-benzene=2/1 (volume ratio), at 67.8 MHz and 25° C. with d6-benzene (128 ppm) as standard. The measured $^{13}$C-NMR spectrum is analyzed according to a proposal of Lindemann Adams (Analysis Chemistry 43, p1245 (1971)) and J. C. Randall (Review Macromolecular Chemistry Physics, C29, 201 (1989)) to obtain a Tαβ/Tαα intensity ratio.

For the ethylene/α-olefin copolymer (A1) according to the present invention, (a7) the B value obtained from a $^{13}$C-NMR spectrum and the following general formula (1) is generally in the range of 0.9 to 1.5, preferably in the range of 0.95 to 1.2.

$$B \text{ value} = [POE]/(2 \cdot [PE][PO]) \quad (1)$$

wherein [PE] represents a mole fraction of the constitutional units derived from ethylene in the copolymer, [PO] represents a mole fraction of the constitutional units derived from the α-olefin in the copolymer, and [POE] represents a proportion of the number of ethylene/α-olefin chains to the total dyad chains in the copolymer.

The B value is an index that indicates a distribution state of ethylene and the C3-20 α-olefin in the ethylene/α-olefin copolymer, and can be obtained based on the reports of J. C. Randall (Macromolecules, 15, 353 (1982)) and J. Ray (Macromolecules, 10, 773 (1977)).

The B value of the ethylene/α-olefin copolymer (A1) is generally determined by measuring a $^{13}$C-NMR spectrum of a sample in which approximately 200 mg of the ethylene/α-olefin copolymer is uniformly dissolved in 1 ml of hexachlorobutadiene, in a sample tube with a diameter of 10 mm under the measuring conditions of a measuring temperature of 120° C., a measuring frequency of 25.05 MHz, a spectral bandwidth of 1500 Hz, a pulse repetition period of 4.2 sec, and a pulse width of 6 μsec.

As the B value is larger, block chains of ethylene or the α-olefin copolymer are shorter, the distribution of ethylene and the α-olefin is more uniform, and the composition distribution of the copolymer rubber is smaller. As the B value is smaller than 1.0, the composition distribution of the ethylene/α-olefin copolymer is larger, and handling properties are deteriorated in some cases.

The ethylene/α-olefin copolymer (A1) described above can be manufactured by a publicly known method using a vanadium catalyst, a titanium catalyst, a metallocene catalyst or the like. In particular, a solution polymerization method described in Japanese Patent Application Laid-Open Publication No. 62-121709 is preferable.

<(A2) Ethylene/Polar Monomer Copolymer>

Examples of the polar monomers in the ethylene/polar monomer copolymer (A2) according to the present invention include unsaturated carboxylic acids, salts thereof, esters thereof, amides thereof, vinyl esters, and carbon monoxide. Specific examples include unsaturated carboxylic acids such as acrylic acid, methacrylic acid, fumaric acid, itaconic acid, monomethyl maleate, monoethyl maleate, maleic anhydride and itaconic anhydride; salts of the unsaturated carboxylic acids with monovalent metals such as lithium, sodium and potassium; salts of the unsaturated carboxylic acids with polyvalent metals such as magnesium, calcium and zinc; unsaturated carboxylic acid esters such as methyl acrylate, ethyl acrylate, isopropyl acrylate, isobutyl acrylate, n-butyl acrylate, iso-octyl acrylate, methyl methacrylate, ethyl methacrylate, isobutyl methacrylate and dimethyl maleate; vinyl esters such as vinyl acetate and vinyl propionate; carbon monoxide, and sulfur dioxide. These monomers may be used singly or two or more kinds may be used in combination.

Specific examples of the ethylene/polar monomer copolymers (A2) include ethylene/unsaturated carboxylic acid copolymers such as ethylene/acrylic acid copolymer and ethylene/methacrylic acid copolymer; ionomers in which the carboxyl groups of the ethylene/unsaturated carboxylic acid copolymers are partly or completely neutralized with the metals described above; ethylene/unsaturated carboxylic acid ester copolymers such as ethylene/methyl acrylate copolymer, ethylene/ethyl acrylate copolymer, ethylene/methyl methacrylate copolymer, ethylene/isobutyl acrylate copolymer and ethylene/n-butyl acrylate copolymer; ethylene/unsaturated carboxylic acid ester/unsaturated carboxylic acid copolymers such as ethylene/isobutyl acrylate/methacrylic acid copolymer and ethylene/n-butyl acrylate/methacrylic acid copolymer, and ionomers thereof in which the carboxyl groups are partly or completely neutralized with the metals described above; and ethylene/vinyl ester copolymers such as ethylene/vinyl acetate copolymer.

Among them, the copolymers of ethylene and polar monomers selected from the unsaturated carboxylic acids, salts thereof, esters thereof, and vinyl acetate are preferable. In particular, the ethylene/(meth)acrylic acid copolymers and ionomers thereof, ethylene/(meth)acrylic acid/(meth)acrylic acid ester copolymers and ionomers thereof, and ethylene/vinyl acetate copolymer are preferable. In particular, the ethylene/vinyl acetate copolymer is most preferable.

The ethylene/polar monomer copolymer (A2) generally has a polar monomer content in the range of 1 to 50 mass %, preferably in the range of 5 to 45 mass %, although this content may vary depending on the kind of polar monomer. In consideration of molding and processing properties and mechanical strength, the ethylene/polar monomer copolymer preferably has a melt flow rate at 190° C. and a load of 2160 g in the range of 0.05 to 500 g/10 minutes, in particular in the range of 0.1 to 100 g/10 minutes. The copolymers of ethylene and the unsaturated carboxylic acids, unsaturated carboxylic acid esters or vinyl esters can be obtained by radical copolymerization at a high temperature and a high pressure. Moreover, the copolymers (ionomers) of ethylene and the metal salts of the unsaturated carboxylic acids can be obtained by reacting an ethylene/unsaturated carboxylic acid copolymer with a corresponding metallic compound.

In the case in which the ethylene/polar monomer copolymer (A2) according to the present invention is ethylene/vinyl acetate copolymer, the vinyl acetate content in the ethylene/vinyl acetate copolymer is generally in the range of 10 to 30 mass %, preferably in the range of 15 to 30 mass %, more preferably in the range of 15, to 25 mass %.

The ethylene/vinyl acetate copolymer usually has a melt flow rate (MFR; ASTM D1238, 190° C., a load of 2.16 kg) in the range of 0.1 to 50 g/10 minutes, preferably in the range of 0.5 to 20 g/10 minutes, more preferably in the range of 0.5 to 5 g/10 minutes.

The ethylene/α-olefin copolymer (A1) and the ethylene/polar monomer copolymer (A2) are used in a mass ratio (A1)/(A2) of 100/0 to 20/80, preferably 100/0 to 30/70.

The copolymer (A2) is an optional component. When this component is used, the obtainable foam layer shows excellent bond properties with respect to other layers of polyurethane, rubber, leather or the like, and is suitably used in a laminate. When the copolymer (A2) is used, the mass ratio (A1)/(A2) is not particularly limited and is preferably in the range of 70/30 to 30/70.

In the case in which the ethylene/polar monomer copolymer (A2) is an ethylene/unsaturated carboxylic acid copolymer and the copolymers are used in the above mass ratio, the obtainable composition can give a crosslinked foam with excellent tearing strength properties and bond properties with respect to other layers of polyurethane, rubber, leather or the like.

<(B) Ethylene/α-olefin/Non-Conjugated Polyene Copolymer>

The ethylene/α-olefin/non-conjugated polyene copolymer (B) according to the present invention is obtained by copolymerizing ethylene, an α-olefin of 3 to 20 carbon atoms, and a non-conjugated polyene.

Examples of the C3-20 α-olefins include propylene, 1-butene, 4-methylpentene-1,1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyldecene-11-methyldodecene-1 and 12-ethyltetradecene-1. Among them, propylene, 1-butene, 4-methylpentene-1,1-hexene and 1-octene are preferable. In particular, propylene is preferable.

The α-olefins may be used singly or two or more kinds may be used in combination.

Examples of the non-conjugated polyenes include chain non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, 8-methyl-4-ethylidene-1,7-nonadiene and 4-ethylidene-1,7-undecadiene; cyclic non-conjugated dienes such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, 5-vinyl-2-norbornene, 5-isopropenyl-2-norbornene, 5-isobutenyl-2-norbornene, cyclopentadiene and norbornadiene; and trienes such as 2,3-diisopropylidene-5-norbornene, 2-ethylidene-3-isopropylidene-5-norbornene, 2-propenyl-2,2-norbornadiene and 4-ethylidene-8-methyl-1,7-nonadiene.

Particularly preferable non-conjugated polyenes in the present invention include 5-ethylidene-2-norbornene, dicyclopentadiene, and non-conjugated polyenes represented by the following general formulae (I) and (II). In particular, the use of the non-conjugated polyene represented by the following general formula (I) or (II) provides an advantage that the obtainable composition can be crosslinked with a smaller amount of a radical generator to give a foam having a low specific gravity.

[Chemical formula 2]

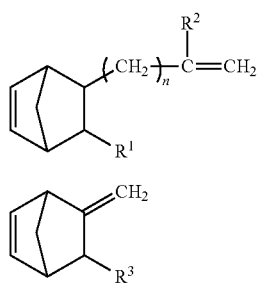

In the general formula (I), n represents an integral number in the range of 0 to 10, and $R^1$ represents a hydrogen atom or an alkyl group of 1 to 10 carbon atoms.

Examples of the alkyl groups of 1 to 10 carbon atoms represented by $R^1$ include methyl group, ethyl group, propyl group, isopropyl group, n-butyl group, isobutyl group, sec-butyl group, t-butyl group, n-pentyl group, isopentyl group, t-pentyl group, neopentyl group, hexyl group, isohexyl group, heptyl group, octyl group, nonyl group and decyl group.

$R^2$ represents a hydrogen atom or an alkyl group of 1 to 5 carbon atoms.

Examples of the alkyl groups of 1 to 5 carbon atoms represented by $R^2$ include the aforementioned alkyl groups having 1 to 5 carbon atoms that are described as examples of $R^1$.

In the general formula (II), $R^3$ represents a hydrogen atom or an alkyl group of 1 to 10 carbon atoms.

Examples of the alkyl groups of 1 to 10 carbon atoms represented by $R^3$ include the aforementioned alkyl groups having 1 to 10 carbon atoms that are described as examples of $R^1$.

Examples of the norbornene compounds represented by the above general formula (I) or (II) include:
5-methylene-2-norbornene,
5-vinyl-2-norbornene,
5-(2-propenyl)-2-norbornene,
5-(3-butenyl)-2-norbornene,
5-(1-methyl-2-propenyl)-2-norbornene,
5-(4-pentenyl)-2-norbornene,
5-(1-methyl-3-butenyl)-2-norbornene,
5-(5-hexenyl)-2-norbornene,
5-(1-methyl-4-pentenyl)-2-norbornene,
5-(2,3-dimethyl-3-butenyl)-2-norbornene,
5-(2-ethyl-3-butenyl)-2-norbornene,
5-(6-heptenyl)-2-norbornene,
5-(3-methyl-5-hexenyl)-2-norbornene,
5-(3,4-dimethyl-4-pentenyl)-2-norbornene,
5-(3-ethyl-4-pentenyl)-2-norbornene,
5-(7-octenyl)-2-norbornene,
5-(2-methyl-6-heptenyl)-2-norbornene,
5-(1,2-dimethyl-5-hexenyl)-2-norbornene,
5-(5-ethyl-5-hexenyl)-2-norbornene and
5-(1,2,3-trimethyl-4-pentenyl)-2-norbornene. Among them,
5-vinyl-2-norbornene,
5-methylene-2-norbornene,
5-(2-propenyl)-2-norbornene,
5-(3-butenyl)-2-norbornene,
5-(4-pentenyl)-2-norbornene,
5-(5-hexenyl)-2-norbornene,
5-(6-heptenyl)-2-norbornene and
5-(7-octenyl)-2-norbornene are preferable. The norbornene compounds may be used singly or two or more kinds may be used in combination.

The ethylene/α-olefin/non-conjugated polyene random copolymer (B) composed of the above components preferably satisfies the following (b1) to (b3).

(b1) Molar Ratio of Ethylene Units and C3-20 α-olefin Units

In the ethylene/α-olefin/non-conjugated polyene random copolymer, the ratio (Et/α) of constitutional units derived from ethylene (Et, mole %) and constitutional units derived from the C3-20 α-olefin(s) (hereafter simply referred to as α-olefin(s) in some cases) (α, mole %) is in the range of 50/50 to 80/20, preferably in the range of 55/45 to 80/20. In particular, it is more preferable that the ratio is in the range of 60/40 to 83/17.

When the ratio (Et/α) is in the above range, the obtainable polymer composition shows excellent processability and weathering resistance and has appropriate flexibility.

(b2) Iodine Value

The iodine value used herein refers to a number of grams (g/100 g) of iodine absorbed in 100 g of the ethylene/α-olefin/non-conjugated polyene random copolymer (B). The iodine value is an index for the degree of unsaturation of the ethylene/α-olefin/non-conjugated polyene random copolymer (B). A larger iodine value means that the degree of unsaturation is higher.

The iodine value of the ethylene/α-olefin/non-conjugated polyene random copolymer (B) is in the range of 0.5 to 50 (g/100 g), preferably in the range of 0.8 to 40 (g/100 g), more preferably in the range of 1 to 30 (g/100 g), particularly preferably in the range of 1.5 to 25 (g/100 g).

When the iodine value is in the above range, the obtainable polymer composition has high crosslinking efficiency and excellent resistance to environmental deterioration and is advantageous in terms of cost.

(b3) Mooney Viscosity

The Mooney viscosity ($ML_{1+4}$ (100° C.)) of the ethylene/α-olefin/non-conjugated polyene random copolymer is generally in the range of 1 to 200, more preferably in the range of 1 to 170, most preferably in the range of 1 to 100. When the Mooney viscosity is in the above range, excellent processability is achieved and the obtainable foam shows excellent compression set resistance. The Mooney viscosity is measured by a method specified in JIS K6395.

The content of constitutional units derived from the non-conjugated polyene(s) in the ethylene/α-olefin/non-conjugated polyene random copolymer (B) is not restricted in particular, and may be in the range of 1.5 to 20 mass %, preferably in the range of 1.5 to 15 mass %, more preferably in the range of 1.5 to 12 mass % (the sum of constitutional units derived from ethylene, constitutional units derived from the α-olefin(s), and constitutional units derived from the non-conjugated polyene(s) is 100 mass %). When the content of the non-conjugated polyene(s) is in the above range, excellent crosslinking efficiency is obtained.

Commercially available ethylene/α-olefin/non-conjugated polyene copolymers may be used in the present invention. Alternatively, the copolymers may be produced by copolymerizing ethylene, the α-olefin(s) and the non-conjugated polyene(s) using a vanadium catalyst or a metallocene catalyst.

<(C) Foaming Agent>

The foaming agent (C) used in the present invention may be a chemical foaming agent. Examples thereof include:
azo compounds such as azodicarbonamide (ADCA),
1,1'-azobis(1-acetoxy-1-phenylethane),
dimethyl-2,2'-azobisbutyrate,
dimethyl-2,2'-azobisisobutyrate,
2,2'-azobis(2,4,4-trimethylpentane),
1,1'-azobis(cyclohexane-1-carbonitrile) and
2,2'-azobis [N-(2-carboxyethyl)-2-methyl-propionamidine];
nitroso compounds such as N,N'-dinitrosopentamethylenetetramine (DPT);
hydrazine derivatives such as
4,4'-oxybis(benzenesulfonylhydrazide) and
diphenylsulfone-3,3'-disulfonylhydrazide;
semicarbazide compounds such as p-toluenesulfonylsemicarbazide;
organic heat decomposable foaming agents such as trihydrazinotriazine;
bicarbonates such as sodium hydrogen carbonate and ammonium hydrogen carbonate;
carbonates such as sodium carbonate and ammonium carbonate;
nitrites such as ammonium nitrite; and
inorganic heat decomposable foaming agents such as hydrogen compounds. Among them, azodicarbonamide (ADCA) and sodium hydrogen carbonate are particularly preferable.

The foaming agent (C) used in the present invention may be a physical foaming agent (a foaming agent that does not always involve chemical reaction in foaming). Examples of such foaming agents (C) include:
aliphatic hydrocarbons such as methanol, ethanol, propane, butane, pentane and hexane;
chlorohydrocarbons such as dichloroethane, dichloromethane and carbon tetrachloride;
organic physical foaming agents such as fluorochlorohydrocarbons such as chlorofluorocarbon; and
inorganic physical foaming agents such as air, carbon dioxide, nitrogen, argon and water. Among them, carbon dioxide, nitrogen and argon are most preferable because they do not need to be vaporized, are inexpensive and are very unlikely to cause environmental pollution and ignition.

The physical foaming agent as the foaming agent (C) does not produce a decomposition residue of the foaming agent, and the composition can be crosslinked and foamed without contamination of a mold. Moreover, the physical foaming agent is not powdery and therefore has excellent kneading properties. The use of the physical foaming agent prevents a foreign odor of the obtainable foam (such as an ammonia odor generated in the decomposition of ADCA).

Such foaming agents (C) may be used in combination with the chemical foaming agents without causing adverse effects such as odor and mold contamination.

If the production scale is small, the physical foaming agent such as carbon dioxide or nitrogen may be stored in a cylinder and may be supplied through a pressure reducing valve to an injection molding machine or an extrusion machine. In some cases, the physical foaming agent may be pressurized by a pump or the like and may be supplied to an injection molding machine or an extrusion machine.

In facility for large scale production of foams, a storage tank of liquefied carbon dioxide or liquefied nitrogen may be installed. The foaming agent may be vaporized through a heat exchanger and may be supplied through pipes and a pressure reducing valve to an injection molding machine or an extrusion machine.

In the case of liquid physical foaming agents, the storage pressure is preferably in the range of 0.13 to 100 MPa.

The chemical foaming agent (C) is generally used in an amount of 2 to 30 parts by mass, preferably 3 to 20 parts by mass, more preferably 5 to 15 parts by mass relative to the total 100 parts by mass of the olefin polymers. For instance, in the case in which the olefin polymer is the ethylene polymer composition, the chemical foaming agent is generally used in an amount of 2 to 30 parts by mass, preferably 3 to 20 parts by mass, more preferably 5 to 15 parts by mass relative to the total 100 parts by mass of the ethylene polymer (A) and the ethylene/α-olefin/non-conjugated polyene copolymer (B). The amount of the chemical foaming agent may be increased or decreased as required depending on an objective foaming ratio because the amount of gas generated depends on a kind and a grade of the foaming agent used.

The physical foaming agent (C) may be used in an appropriate amount which is determined depending on a desired foaming ratio. In general, the physical foaming agent is used in an amount of 0.1 to 15 parts by mass, preferably 0.5 to 10 parts by mass relative to the total 100 parts by mass of the olefin polymers. In the case in which the olefin polymer is the ethylene polymer composition, the physical foaming agent is usually used in an amount of 0.1 to 15 parts by mass, preferably 0.5 to 10 parts by mass relative to the total 100 parts by mass of the ethylene polymer (A) and the ethylene/α-olefin/non-conjugated polyene copolymer (B).

In the present invention, a foaming assistant may be used together with the foaming agent (C) as required. The foaming assistant decreases the decomposition temperature of the foaming agent (C), accelerates the decomposition, and homogenizes air bubbles. Examples of the foaming assistants include organic acids such as zinc oxide (ZnO), zinc stearate, salicylic acid, phthalic acid, stearic acid and oxalic acid; urea and derivatives thereof.

<(D) Radical Generator>

In the present invention, a radical generator (D) may be optionally used as a crosslinking agent. Examples of the radical generator (D) include organic peroxides such as dicumyl peroxide, di-t-butyl peroxide,
2,5-dimethyl-2,5-di-(t-butylperoxy)hexane,
2,5-dimethyl-2,5-di-(t-butylperoxy)hexyne-3,
1,3-bis(t-butylperoxyisopropyl)benzene,
1,1-bis(t-butylperoxy)-3,3,5-trimethylcyclohexane,
n-butyl-4,4-bis(t-butylperoxy)valerate,
benzoylperoxide,
p-chlorobenzoylperoxide,
2,4-dichlorobenzoyl peroxide,
t-butyl peroxybenzoate,
t-butyl perbenzoate,
t-butylperoxyisopropyl carbonate,
diacetyl peroxide,
lauroyl peroxide and
t-butylcumyl peroxide. Among them, dicumyl peroxide is preferable.

In the present invention, the radical generator (D) is usually used in an amount of 0.1 to 1.5 parts by mass, preferably 0.2 to 1.0 part by mass, more preferably 0.2 to 0.7 part by mass relative to the total 100 parts by mass of the olefin polymers. In the case in which the olefin polymer is the ethylene polymer composition, the radical generator is generally used in an amount of 0.1 to 1.5 parts by mass, preferably 0.2 to 1.0 part by mass, more preferably 0.2 to 0.7 part by mass relative to the total 100 parts by mass of the ethylene polymer (A) and the ethylene/α-olefin/non-conjugated polyene copolymer (B). When the radical generator (D) is used in this amount, the obtainable crosslinked foam has a suitable crosslinked structure.

<(E) Crosslinking Assistant>

In the present invention, a crosslinking assistant (E) may be used as required. Preferred examples thereof include:
sulfur;
peroxy crosslinking assistants such as p-quinonedioxime,
p,p'-dibenzoylquinonedioxime,
N-methyl-N-4-dinitrosoaniline,
nitrosobenzene,
diphenylguanidine and
trimethylolpropane-N,N'-m-phenylene dimaleimide;
divinylbenzene,
triallyl cyanurate (TAC) and
triallyl isocyanurate (TAIC). Examples further include polyfunctional methacrylate monomers such as
ethylene glycol dimethacrylate,
diethylene glycol dimethacrylate,
polyethylene glycol dimethacrylate,
trimethylolpropane trimethacrylate and
allyl methacrylate; and
polyfunctional vinyl monomers such as
vinyl butyrate and
vinyl stearate. Among them, triallyl cyanurate (TAC) and triallyl isocyanurate (TAIC) are preferable.

In the present invention, the crosslinking assistant (E) is preferably used in an amount such that the mass ratio [(E)/(D)] of the crosslinking assistant (E) and the radical generator (D) is in the range of 1/30 to 5/1, preferably in the range of 1/20 to 3/1, more preferably in the range of 1/15 to 2/1, particularly preferably in the range of 1/10 to 1/1.

<Method for Manufacturing Foam>

The foam according to the present invention may be manufactured by, for example, the following method from the olefin polymer optionally together with (C) the foaming agent, (D) the radical generator, (E) the crosslinking assistant and various additives such as a filler, a heat stabilizer, a weathering stabilizer, a flame retardant, a hydrochloric acid absorber and a pigment (these may be added while still achieving the objects of the present invention). (Hereinbelow, the olefin polymer and the optional components may be collectively referred to as the components including the olefin polymer.) However, the manufacturing method is not restricted to the exemplary method described below. The olefin polymer is preferably the ethylene polymer composition described above.

The ethylene polymer composition that is a preferable embodiment of the olefin polymer according to the present invention includes the ethylene polymer (A) in an amount of more than 80 mass % to 99 mass % which polymer includes the ethylene/α-olefin copolymer (A1) that satisfies (a1) and (a2) and the ethylene/polar monomer copolymer (A2) in a mass ratio of (A1)/(A2)=100/0 to 20/80; and the ethylene/C3-20 α-olefin/non-conjugated polyene copolymer (B) in an amount of 1 mass % to less than 20 mass % (the sum of (A) and (B) is 100 mass %), which copolymer satisfies (b1), (b2) and (b3).

The olefin polymer, preferably the ethylene polymer composition, used in the invention is in an uncrosslinked and unfoamed state, and may be in a molten state or may be in the form of pellets or sheet solidified by cooling.

Pellets of the components including the olefin polymer, preferably pellets of the ethylene polymer composition, may be produced as follows. The olefin polymer (preferably the ethylene polymer (A) and the ethylene/α-olefin/non-conjugated polyene copolymer (B)) and optionally the foaming agent (C), the radical generator (D), the crosslinking assistant (E) and foaming assistant are mixed with a Henschel mixer in the above-mentioned ratio. The mixture is molten and plasticized with a kneading machine such as a Banbury mixer, a roll or an extrusion machine at a temperature at which the foaming agent (C) and/or the radical generator (D) will not be decomposed. The components are mixed and dispersed uniformly and then pelletized with a pelletizer. Examples of the methods for crosslinking and foaming include crosslinking by heat treatment and crosslinking with an ionizing radiation as will be described later. In the case of crosslinking by heat treatment, the composition preferably includes the radical generator (D) and the crosslinking assistant (E). In the case of crosslinking with an ionizing radiation, the crosslinking assistant may be added.

The olefin polymer may be optionally used together with (C) the foaming agent, (D) the radical generator, (E) the crosslinking assistant and, as needed, many kinds of additives such as a filler, a heat stabilizer, a weathering stabilizer, a flame retardant, a hydrochloric acid absorber and a pigment while still achieving the objects of the invention.

In particular, in addition to the above components, many kinds of additives such as a filler, a heat stabilizer, a weathering stabilizer, a flame retardant, a hydrochloric acid absorber and a pigment may be compounded in the ethylene polymer composition as required while still achieving the objects of the invention.

A sheet of the components including the olefin polymer, preferably a sheet of the ethylene polymer composition, may be prepared from the pellets using an extruder or a calendering machine. Alternatively, the components including the olefin polymer, preferably the components of the ethylene polymer composition, may be kneaded with a Brabender mixer or the like, and the mixture may be formed into a sheet with a calender roll or a press molding machine. Still alternatively, the components may be kneaded with an extruder and the mixture may be formed into a sheet through a T-die or a ring die. By these methods, foamable sheets in an uncrosslinked and unfoamed state can be prepared.

[Preparation of Foam]

Methods for manufacturing the foam (uncrosslinked or crosslinked) according to the present invention are not particularly limited. For example, the foam may be prepared by the following method.

For instance, a sheet including the olefin polymer may be obtained using a calendering machine, a press molding machine or a T-die extruder. Preferably, a sheet of the ethylene polymer composition may be obtained using a calendering machine, a press molding machine or a T-die extruder. The sheet is preferably formed at temperatures not more than decomposition temperatures of the foaming agent (C) and the organic peroxide (D) as the radical generator. More specifically, it is preferable that the sheet is formed under conditions such that the components including the olefin polymer in the molten state are at 100 to 130° C. In the case in which the olefin polymer is the ethylene polymer composition, it is also preferable that the sheet is formed under conditions such that the molten ethylene polymer composition is at 100 to 130° C.

An exemplary method for manufacturing a primary foam from the sheet obtained by the above method will be described. The sheet is cut to a size in the range of 1.0 to 1.2 relative to a volume of a mold, and is inserted in the mold held at 130 to 200° C. A primary foam (an uncrosslinked or crosslinked foam) is prepared under the conditions in which the mold clamping pressure is in the range of 30 to 300 kgf/cm$^2$ and the retention time is in the range of 10 to 90 minutes. That is, the foam (uncrosslinked or crosslinked foam) is prepared by heat treatment. Because the retention time depends on the mold thickness, the retention time may be increased or decreased outside the above range.

Shapes of the mold for producing the (crosslinked) foam are not particularly limited. The mold usually has a shape such that a sheet will be obtained. It is preferable that the mold has a structure capable of being completely sealed to prevent the leakage of the molten resin and a gas generated by decomposition of the foaming agent. The mold preferably has a tapered inner surface to permit easy release of the resin.

In addition to the above method, the components including the olefin polymer, preferably the ethylene polymer composition, may be extruded with an extrusion machine and may be foamed as soon as the resin is released in the atmosphere. This extrusion foaming method also produces the foam according to the present invention. That is, the foam can be manufactured by heat treatment.

Alternatively, the components including the olefin polymer, preferably the ethylene polymer composition, may be injected in a mold at not more than decomposition temperatures of the foaming agent (C) and the radical generator (D), and the resin may be crosslinked and foamed in the mold at temperatures kept in the range of, for example, about 130 to 200° C. (injection foaming method). That is, the foam may be manufactured by heat treatment.

The primary foam obtained by the above method is given a predetermined shape by compression molding. As an example of compression molding conditions, the mold temperature is in the range of 130 to 200° C., the mold clamping pressure is in the range of 30 to 300 kgf/cm$^2$, the compression time is in the range of 5 to 60 minutes, and the compression ratio is in the range of 1.1 to 3.0, preferably in the range of 1.3 to 2.

Production of a crosslinked foam by crosslinking by application of an ionizing radiation will be described. The olefin polymer (preferably the ethylene polymer (A) and the ethylene/α-olefin/non-conjugated polyene copolymer (B)), an organic heat decomposable foaming agent as the foaming agent (C), and additives are melt-kneaded at a temperature less than a decomposition temperature of the organic heat decomposable foaming agent. The resultant kneaded product is then formed into a sheet to give a sheet foam.

The sheet foam is irradiated with an ionizing radiation at a predetermined dose and is crosslinked. The crosslinked sheet foam is heated to at least the decomposition temperature of the organic heat decomposable foaming agent and the sheet is foamed, giving a crosslinked sheet foam. That is, the foam may be manufactured by heat treatment.

Examples of the ionizing radiations include α rays, β rays, γ rays, electron rays, neutron rays and X rays. Among them, cobalt-60 γ rays and electron rays are preferably used.

Exemplary shapes of the foam include sheets, thick boards, nets and moldable shapes.

The crosslinked foam obtained as described above is given a predetermined shape by compression molding, and thereby a secondary foam is manufactured. As an example of compression molding conditions, the mold temperature is in the range of 130 to 200° C., the mold clamping pressure is in the range of 30 to 300 kgf/cm$^2$, the compression time is in the range of 5 to 60 minutes, and the compression ratio is in the range of 1.1 to 3.0.

Among the above manufacturing methods, it is preferable that the foam is obtained by heat treating the components including the olefin polymer (preferably the ethylene polymer composition).

In an embodiment of the present invention, a foam may be obtained by foaming the ethylene polymer composition. The foam preferably has a specific gravity of 0.03 to 0.30. In the foam obtained by foaming the ethylene polymer composition, the compression set (CS, %) and the specific gravity (d) are not particularly limited. However, it is preferable that the compression set (CS, %) and the specific gravity (d) satisfy CS≤−279×(d)+95. The foam satisfying this condition is lightweight and has small compression set. The foam in this embodiment may be suitably used for a laminate, footwear and footwear components described below.

<Laminate>

A laminate according to the present invention includes a layer of the foam (uncrosslinked or crosslinked foam) according to the present invention and a layer made of at least one material selected from the group consisting of polyolefin, polyurethane, rubber, leather and synthetic leather.

The polyolefin, polyurethane, rubber, leather and synthetic leather are not particularly limited. Known polyolefins, polyurethanes, rubbers, leather and synthetic leather may be used. The laminate is suitable for use in footwear and footwear components in particular.

<Footwear and Footwear Components>

Footwear and footwear components according to the present invention include the foam (uncrosslinked or crosslinked foam) or the laminate according to the present invention. Examples of the footwear components include shoe soles, mid soles, inner soles, soles and sandals.

Because of having the foam or the laminate according to the present invention, the footwear and footwear components of the present invention are lightweight and resistant to deformation by long use.

EXAMPLES

The present invention will be described by examples below without limiting the scope of the invention. The density, MFR, B value, Tαβ intensity ratio and molecular weight distribution (Mw/Mn) of ethylene/1-butene copolymer used in Examples and Comparative Examples were measured by the following methods.

[Evaluation of Physical Properties of ethylene/1-butene Copolymer]
(1) Density

The density was measured at 23° C. according to ASTM D1505.

(2) MFR

MFR was measured at 190° C. according to ASTM D1238. A value measured at a load of 2.16 kg is expressed as MFR2, and a value measured at a load of 10 kg is expressed as MFR10.

(3) B Value and Tαβ Intensity Ratio

The B value and the Tαβ intensity ratio were measured using JEOL-GX270 NMR measuring apparatus manufactured by JEOL, Ltd. The measurement was carried out using a 5 mass % solution of a sample in hexachlorobutadiene/d6-benzene=2/1 (volume ratio), at 67.8 MHz and 25° C., and with d6-benzene (128 ppm) as standard. The recorded $^{13}$C-NMR spectrum was analyzed according to a proposal of Lindemann Adams (Analysis Chemistry 43, p1245 (1971)) and J. C. Randall (Review Macromolecular Chemistry Physics, C29, 201 (1989)) to determine the Tαβ/Tαα intensity ratio.

(4) Molecular Weight Distribution (Mw/Mn)

The molecular weight distribution was measured by gel permeation chromatography (GPC) using orthodichlorobenzene solvent at 140° C. The measurement was performed with gel permeation chromatograph Alliance GPC-2000 manufactured by Waters Co., Ltd., as follows. Separation columns were two TSKgel GNH6-HT columns and two TSKgel GNH6-HTL columns. The columns had a diameter of 7.5 mm and a length of 300 mm. The column temperature was 140° C. The mobile phase was o-dichlorobenzene (Wako Pure Chemical Industries, Ltd.), and 0.025 mass % of BHT (Takeda Pharmaceutical Company Limited.) was used therewith as an antioxidant. The mobile phase was passed at 1.0 ml/min. The sample concentration was 15 mg/10 ml, and the amount of sample injected was 500 μL. A differential refractometer was used as a detector. For molecular weights of Mw<1000 and Mw>4×10$^6$, polystyrenes manufactured by TOSOH CORPORATION were used as standards. For molecular weights of 1000≤Mw≤4×10$^6$, polystyrenes manufactured by Pressure Chemical Co., Ltd. were used as standards.

[Evaluation of Physical Properties of Crosslinked Foam]
(i) Specific Gravity

The specific gravity was measured according to JIS K7222. In the case of a cube foam, a sample was sampled from an area that was found at least 20 mm inward from the four sides of the largest plane and at least 2.5 mm deep from the surface of the plane and from the surface of a plane parallel thereto. This sampling location applied to sample foams with other various shapes. Specifically, a sample was sampled from an area that was found at least 20 mm inward from the edges (sides) of the opposed largest planes as upper and lower surfaces and at least 2.5 mm deep from the upper and lower surfaces.

In the case in which the foam was to be used for a mid sole, a sample was prepared from an area found at least 20 mm inward from the edges and at least 2.5 mm deep from the approximately parallel planes.

The specific gravity was measured at five points in the foam and the results were averaged. The specific gravity at five points of the foam determines the uniformity of quality of the foam. The difference between the maximum and minimum values of the five points is preferably not more than 0.08, more preferably not more than 0.06. The difference by more than 0.08 means that the quality of the product (e.g., hardness, mechanical properties and compression set) is not uniform. FIG. 1 shows five points for measurement.

(ii) Compression Set (CS)

The compression set (CS) was measured according to JIS K6262. A foam was cut in a cylindrical shape with a diameter of 30 mm and a thickness of at least 15 mm, and a sample was prepared by cutting the cylinder to a thickness of 10 mm by eliminating at least 2.5 mm from the two parallel faces of the cylinder.

This sample preparation applied to sample foams with other various shapes. Specifically, a foam was cut in a cylindrical shape with a diameter of 30 mm and a thickness of at least 15 mm, and a sample was prepared by cutting the cylinder to a thickness of 10 mm by eliminating at least 2.5 mm from the two parallel faces of the cylinder.

A cylindrically hollow dumbbell implement may be used for cutting the foam in a cylindrical shape or for sampling the sample from under the parallel planes of the foam.

The sample was left at rest in the environment of 50% compression and 50° C. for 6 hours. The thickness was measured 30 minutes after the sample was released from the compression. The compression set (CS) was calculated by the following formula.

$$CS=(t0-t1)/(t0-t2)\times 100$$

t0: Initial sample thickness (mm)
t1: Thickness (mm) measured 30 minutes after the sample was removed from compression apparatus
t2: Spacer thickness (mm)

(iii) Impact Resilience

The impact resilience was measured according to JIS K6255. A sample was prepared by the same method as used in the above (2) Compression set (CS). The impact resilience was measured in the atmosphere of 23° C.

(iv) Tearing Strength

The tearing strength was measured according to ASTM D3574 in the environment of 23° C. A tensile tester was used as a testing machine, and the stress rate was 100 mm/min. The tearing strength Tr (N/mm) was calculated by the following formula.

$$Tr=T0/T1\times 9.81$$

t0: Tearing stress (kg)
t1: Sample width (mm)

(v) Asker C Hardness

The Asker C hardness was measured in the environment of 23° C. according to "Type C test method of spring hardness test" described in the appendix 2 of JIS K7312-1996.

<Manufacturing Example of ethylene/1-butene Copolymer (A-1)>

[Preparation of Catalyst Solution]

Triphenylcarbenium(tetrakispentafluorophenyl) borate (18.4 mg) was dissolved by addition of 5 ml of toluene, and a 0.004 mmol/ml toluene solution was prepared. Separately, 1.8 mg of [dimethyl(t-butylamido)(tetramethyl-η5-cyclopentadienyl) silane]titanium dichloride was dissolved by addition of 5 ml of toluene, and a 0.001 mmol/ml toluene solution was prepared.

[Preparation of ethylene/1-butene Copolymer (A-1)]

To a 1.5 L SUS autoclave that was sufficiently purged with nitrogen and was equipped with a stirring blade, 750 ml of heptane and 0.15 ml of a 1.0 mmol/ml hexane solution of triisobutyl aluminum (TIBA) were fed at ordinary temperature. While rotating the stirring blade and cooling the autoclave with ice, 6 g of 1-butene and 150 Nml of hydrogen were fed to the autoclave. The autoclave was then heated to 100° C. and was pressurized with ethylene to a total pressure of 0.6

MPaG. When the internal pressure of the autoclave reached 0.6 MPaG, 0.38 ml of the above-prepared [dimethyl(t-butylamido)(tetramethyl-η5-cyclopentadienyl) silane]titanium dichloride and 0.38 ml of the above-prepared triphenylcarbenium(tetrakispentafluorophenyl) borate were injected with nitrogen, and the polymerization was initiated. For the following 5 minutes, the temperature was controlled so that the internal temperature of the autoclave was 100° C., and ethylene was directly supplied to maintain the pressure at 0.6 MPaG. After 5 minutes from the initiation of the polymerization, 5 ml of methanol was introduced with nitrogen to the autoclave to stop the polymerization, and the autoclave was evacuated to atmospheric pressure. To the reaction solution, 3 L of methanol was poured with stirring. The resultant polymer containing the solvent was dried at 130° C. under a reduced pressure for 13 hours to give 12 g of an ethylene/butene copolymer (A-1). These operations were repeated, and the batches of the copolymer were collected and melt-kneaded. The copolymer thus obtained was used in the following examples. Properties of the melt-kneaded ethylene/1-butene copolymer (A-1) are shown in Table 1. The ethylene/1-butene copolymer (A-1) contained 90 mole % of constitutional units derived from ethylene and 10 mole % of constitutional units derived from 1-butene.

TABLE 1

| Polymer properties | Manufacturing example Ethylene/1-butene copolymer (A1) |
|---|---|
| Density (g/cm$^3$) | 0.905 |
| Melt flow rate | 1.2 |
| Mw/Mn | 2.0 |
| MFR10/MFR2 | 9.6 |
| B value | 1.0 |
| Tαβ/Tαα | 0.3 |

The following ethylene/α-olefin/non-conjugated polyene copolymers were used in Examples.
(B-1) Ethylene/propylene/5-vinyl-2-norbornene copolymer Mitsui EPT (product name) PX-055: manufactured by Mitsui Chemicals, Inc.
(b1) (Et/α)=71/29 (molar ratio)
(b2) Iodine value=10
(b3) Mooney viscosity (ML$_{1+4}$)=8
(b4) Content of non-conjugated polyene=4.5 mass %
(B-2) Ethylene/propylene/5-vinyl-2-norbornene copolymer Mitsui EPT (product name) PX-046: manufactured by Mitsui Chemicals, Inc.
(b1) (Et/α)=69/31 (molar ratio)
(b2) Iodine value=10
(b3) Mooney viscosity (ML$_{1+4}$)=50
(b4) Content of non-conjugated polyene=4.5 mass %
(B-3) Ethylene/propylene/5-vinyl-2-norbornene copolymer Mitsui EPT (product name) PX-061: manufactured by Mitsui Chemicals, Inc.
(b1) (Et/α)=65/35 (molar ratio)
(b2) Iodine value=2
(b3) Mooney viscosity (ML$_{1+4}$)=150
(b4) Content of non-conjugated polyene=1.5 mass %
(B-4) Ethylene/propylene/5-ethylidene-2-norbornene copolymer Mitsui EPT (product name) 1045: manufactured by Mitsui Chemicals, Inc.
(b1) (Et/α)=70/30 (molar ratio)
(b2) Iodine value=11
(b3) Mooney viscosity (ML$_{1+4}$)=38
(b4) Content of non-conjugated polyene=5.0 mass %
(B-5) Ethylene/propylene/dicyclopentadiene copolymer Mitsui EPT (product name) 3045: manufactured by Mitsui Chemicals, Inc.
(b1) (Et/α)=68/32 (molar ratio)
(b2) Iodine value=10
(b3) Mooney viscosity (ML$_{1+4}$)=40
(b4) Content of non-conjugated polyene=4.7 mass %
(Et/α) (b1) represents a ratio of the content (Et, mole %) of ethylene-derived constitutional units and the content (α, mole %) of constitutional units derived from the C3-20 α-olefin(s) in each of (B-1) to (B-5). (Et/α) was measured by $^{13}$C-NMR.

The methods used for measuring the physical properties (b2) to (b4) will be briefly described below.

The iodine value (b2) indicates the number of grams (g/100 g) of iodine absorbed in 100 g of each of (B-1) to (B-5). The iodine value is an index for the degree of unsaturation. A larger iodine value indicates that the degree of unsaturation is higher. The iodine value was measured according to JIS K6253.

The Mooney viscosity (ML$_{1+4}$) (b3) was measured at 100° C. in accordance with JIS K6395.

The content of non-conjugated polyene (b4) was measured in accordance with IISRP standard test method.

Dicumyl peroxide (DCP) used as the radical generator (D) was Mitsui DCP (product name) [manufactured by Mitsui Chemicals, Inc.], and the concentration thereof was 98% or higher.

Example 1

A mixture consisted of 95 parts by mass of the ethylene/1-butene copolymer (A-1), 5 parts by mass of the ethylene/propylene/5-vinyl-2-norbornene copolymer (B-1: Mitsui EPT (product name) PX-055), 3.0 parts by mass of zinc oxide, 0.7 part by mass of dicumyl peroxide (DCP), 0.07 part by mass (in terms of TAIC content) of triallyl isocyanurate (TAIC) [product name: M-60 (content of TAIC was 60%) manufactured by Nihon Kasei Co., Ltd.], and 6.0 parts by mass of azodicarbonamide. The mixture was kneaded with a roll at a roll surface temperature of 120° C. for 10 minutes and was then formed into a sheet.

The sheet obtained was introduced in a press mold, and was pressed and heated under the conditions of 150 kg/cm$^2$ and 155° C. for 30 minutes. Consequently, a primary crosslinked foam was obtained. The press mold had a thickness of 15 mm, a longitudinal length of 150 mm and a transverse length of 200 mm.

The primary crosslinked foam was then compression molded for 10 minutes under the conditions of 150 kg/cm$^2$ and 155° C. to give a secondary crosslinked foam. The secondary crosslinked foam had a thickness of 15 mm, a longitudinal length of 160 mm and a transverse length of 250 mm.

The specific gravity, compression set, Asker C hardness and impact resilience of the secondary crosslinked foam were measured according to the above-described methods. The results are shown in Table 2.

With respect to the crosslinked foam, MFR measurement was attempted at 190° C. and a load of 2.16 kg, but the sample showed no fluidity. Namely, MFR was below 0.01 g/10 minutes.

Example 2

A secondary crosslinked foam was prepared in the same manner as in Example 1 except that the ethylene/1-butene copolymer (A-1) was used in an amount of 93 parts by mass, the ethylene/propylene/5-vinyl-2-norbornene copolymer (B-1: Mitsui EPT (product name) PX-055) was used in an amount of 7 parts by mass, the amount of dicumyl peroxide (DCP) was changed from 0.7 part by mass to 0.5 part by mass, and the amount of azodicarbonamide was changed from 6.0 parts by mass to 5.8 parts by mass. The physical properties were measured. The results are shown in Table 2.

With respect to the crosslinked foam, MFR measurement was attempted at 190° C. and a load of 2.16 kg, but the sample showed no fluidity. Namely, MFR was below 0.01 g/10 minutes.

Example 3

A secondary crosslinked foam was prepared in the same manner as in Example 1 except that the ethylene/1-butene copolymer (A-1) was used in an amount of 90 parts by mass, the ethylene/propylene/5-vinyl-2-norbornene copolymer (B-1: Mitsui EPT (product name) PX-055) was used in an amount of 10 parts by mass, the amount of dicumyl peroxide (DCP) was changed from 0.7 part by mass to 0.5 part by mass, and the amount of azodicarbonamide was changed from 6.0 parts by mass to 5.8 parts by mass. The physical properties were-measured. The results are shown in Table 2.

With respect to the crosslinked foam, MFR measurement was attempted at 190° C. and a load of 2.16 kg, but the sample showed no fluidity. Namely, MFR was below 0.01 g/10 minutes.

Example 4

A secondary crosslinked foam was prepared in the same manner as in Example 1 except that the ethylene/1-butene copolymer (A-1) was used in an amount of 90 parts by mass, the ethylene/propylene/5-vinyl-2-norbornene copolymer (B-1: Mitsui EPT (product name) PX-055) was used in an amount of 10 parts by mass, the amount of dicumyl peroxide (DCP) was changed from 0.7 part by mass to 0.5 part by mass, and the amount of azodicarbonamide was changed from 6.0 parts by mass to 5.0 parts by mass. The physical properties were measured. The results are shown in Table 2.

With respect to the crosslinked foam, MFR measurement was attempted at 190° C. and a load of 2.16 kg, but the sample showed no fluidity. Namely, MFR was below 0.01 g/10 minutes.

Example 5

A secondary crosslinked foam was prepared in the same manner as in Example 1 except that the ethylene/1-butene copolymer (A-1) was used in an amount of 90 parts by mass, the ethylene/propylene/5-vinyl-2-norbornene copolymer (B-1: Mitsui EPT (product name) PX-055) was used in an amount of 10 parts by mass, the amount of dicumyl peroxide (DCP) was changed from 0.7 part by mass to 0.5 part by mass, and the amount of azodicarbonamide was changed from 6.0 parts by mass to 4.5 parts by mass. The physical properties were measured. The results are shown in Table 2.

With respect to the crosslinked foam, MFR measurement was attempted at 190° C. and a load of 2.16 kg, but the sample showed no fluidity. Namely, MFR was below 0.01 g/10 minutes.

Example 6

A secondary crosslinked foam was prepared in the same manner as in Example 1 except that the ethylene/1-butene copolymer (A-1) was used in an amount of 90 parts by mass, the ethylene/propylene/5-vinyl-2-norbornene copolymer (B-1: Mitsui EPT (product name) PX-055) was used in an amount of 10 parts by mass, the amount of dicumyl peroxide (DCP) was changed from 0.7 part by mass to 0.5 part by mass, and the amount of azodicarbonamide was changed from 6.0 parts by mass to 4.0 parts by mass. The physical properties were measured. The results are shown in Table 2.

With respect to the crosslinked foam, MFR measurement was attempted at 190° C. and a load of 2.1-6 kg, but the sample showed no fluidity. Namely, MFR was below 0.01 g/10 minutes.

Example 7

A secondary crosslinked foam was prepared in the same manner as in Example 1 except that the ethylene/1-butene copolymer (A-1) was used in an amount of 85 parts by mass, the ethylene/propylene/5-vinyl-2-norbornene copolymer (B-1: Mitsui EPT (product name) PX-055) was used in an amount of 15 parts by mass, the amount of dicumyl peroxide (DCP) was changed from 0.7 part by mass to 0.4 part by mass, and the amount of azodicarbonamide was changed from 6.0 parts by mass to 5.8 parts by mass. The physical properties were measured. The results are shown in Table 2.

With respect to the crosslinked foam, MFR measurement was attempted at 190° C. and a load of 2.16 kg, but the sample showed no fluidity. Namely, MFR was below 0.01 g/10 minutes.

Example 8

A secondary crosslinked foam was prepared in the same manner as in Example 1 except that the ethylene/1-butene copolymer (A-1) was used in an amount of 90 parts by mass and the ethylene/propylene/5-vinyl-2-norbornene copolymer (B-2: Mitsui EPT (product name) PX-046) was used in an amount of 10 parts by mass. The physical properties were measured. The results are shown in Table 2.

With respect to the crosslinked foam, MFR measurement was attempted at 190° C. and a load of 2.16 kg, but the sample showed no fluidity. Namely, MFR was below 0.01 g/10 minutes.

Example 9

A secondary crosslinked foam was prepared in the same manner as in Example 1 except that the ethylene/1-butene copolymer (A-1) was used in an amount of 90 parts by mass and the ethylene/propylene/5-vinyl-2-norbornene copolymer (B-3: Mitsui EPT PX-061) was used in an amount of 10 parts by mass. The physical properties were measured. The results are shown in Table 2.

With respect to the crosslinked foam, MFR measurement was attempted at 190° C. and a load of 2.16 kg, but the sample showed no fluidity. Namely, MFR was below 0.01 g/10 minutes.

Example 10

A secondary crosslinked foam was prepared in the same manner as in Example 1 except that the ethylene/1-butene copolymer (A-1) was used in an amount of 90 parts by mass and the ethylene/propylene/5-ethylidene-2-norbornene copolymer (B-4: Mitsui EPT (product name) 1045) was used in an amount of 10 parts by mass. The physical properties were measured. The results are shown in Table 2.

With respect to the crosslinked foam, MFR measurement was attempted at 190° C. and a load of 2.16 kg, but the sample showed no fluidity. Namely, MFR was below 0.01 g/10 minutes.

Example 11

A secondary crosslinked foam was prepared in the same manner as in Example 1 except that the ethylene/1-butene copolymer (A-1) was used in an amount of 90 parts by mass and the ethylene/propylene/dicyclopentadiene copolymer (B-5: Mitsui EPT (product name) 3045) was used in an amount of 10 parts by mass. The physical properties were measured. The results are shown in Table 2.

With respect to the crosslinked foam, MFR measurement was attempted at 190° C. and a load of 2.16 kg, but the sample showed no fluidity. Namely, MFR was below 0.01 g/10 minutes.

Comparative Example 1

A secondary crosslinked foam was prepared in the same manner as in Example 1 except that the amount of the ethylene/1-butene copolymer (A-1) was changed from 90 parts by mass to 100 parts by mass and the amount of azodicarbonamide was changed from 5.8 parts by mass to 5.6 parts by mass. The physical properties were measured. The results are shown in Table 2.

Comparative Example 2

A secondary crosslinked foam was prepared in the same manner as in Example 1 except that the amount of the ethylene/1-butene copolymer (A-1) was changed from 90 parts by mass to 100 parts by mass and the amount of azodicarbonamide was changed from 5.8 parts by mass to 4.8 parts by mass. The physical properties were measured. The results are shown in Table 2.

Comparative Example 3

A secondary crosslinked foam was prepared in the same manner as in Example 1 except that the amount of the ethylene/1-butene copolymer (A-1) was changed from 90 parts by mass to 100 parts by mass and the amount of azodicarbonamide was changed from 5.8 parts by mass to 3.4 parts by mass. The physical properties were measured. The results are shown in Table 2.

Comparative Example 4

A secondary crosslinked foam was prepared in the same manner as in Example 1 except that the ethylene/1-butene copolymer (A-1) was used in an amount of 75 parts by mass and the ethylene/propylene/5-vinyl-2-norbornene copolymer (B-1: Mitsui EPT (product name) PX-055) was used in an amount of 25 parts by mass. The physical properties were measured. The results are shown in Table 2.

Comparative Example 5

A secondary crosslinked foam was prepared in the same manner as in Example 1 except that the ethylene/1-butene copolymer (A-1) was used in an amount of 75 parts by mass, the ethylene/propylene/5-vinyl-2-norbornene copolymer (B-1: Mitsui EPT (product name) PX-055) was used in an amount of 25 parts by mass, and the amount of dicumyl peroxide (DCP) was changed from 0.7 part by mass to 0.2 part by mass. The physical properties were measured. The results are shown in Table 2.

TABLE 2

| | | | Embodiment | | | | | | | | | |
|---|---|---|---|---|---|---|---|---|---|---|---|---|
| | | | 1 | 2 | 3 | 4 | 5 | 6 | 7 | 8 | 9 |
| Composition (part by mass) | (A1) | A-1 | 95 | 93 | 90 | 90 | 90 | 90 | 85 | 90 | 90 |
| | (B) | B-1 | 5 | 7 | 10 | 10 | 10 | 10 | 15 | | |
| | | B-2 | | | | | | | | 10 | |
| | | B-3 | | | | | | | | | 10 |
| | | B-4 | | | | | | | | | |
| | | B-5 | | | | | | | | | |
| | (C) | Azodicarbonamide (ADCA) | 6 | 5.8 | 5.8 | 5 | 4.5 | 4 | 5.8 | 6 | 6 |
| | (D) | Dicumyl peroxide (DCP) | 0.7 | 0.5 | 0.5 | 0.5 | 0.5 | 0.5 | 0.4 | 0.7 | 0.7 |
| Physical properties (150% compressed product) | (i) | Average specific gravity | 0.1 | 0.1 | 0.09 | 0.11 | 0.14 | 0.17 | 0.11 | 0.11 | 0.1 |
| | | Difference between the maximum value and the minimum value of measured specific gravity values | 0.03 | 0.03 | 0.03 | 0.03 | 0.04 | 0.04 | 0.04 | 0.02 | 0 |
| | (iii) | Impact resilience (cm) | 45 | 46 | 45 | 47 | 44 | 46 | 42 | 48 | 52 |
| | (iv) | Tearing strength (N/mm) | 2.1 | 2.2 | 2 | 2.4 | 3.2 | 3.8 | 2.1 | 2.2 | 2 |
| | (v) | Asker C hardness | 52 | 54 | 55 | 59 | 64 | 68 | 61 | 58 | 47 |
| | (ii) | Compression permanent strain (CS) % | 61 | 57 | 57.7 | 56 | 55.5 | 48 | 54 | 57 | 63 |
| | | $-279 \times$ (average specific gravity) + 95 | 67.7 | 66.3 | 69.6 | 63.2 | 55.7 | 48.7 | 64.3 | 64.9 | 69 |

| | | | Embodiment | | Comparative example | | | | |
|---|---|---|---|---|---|---|---|---|---|
| | | | 10 | 11 | 1 | 2 | 3 | 4 | 5 |
| Composition (part by mass) | (A1) | A-1 | 90 | 90 | 100 | 100 | 100 | 75 | 75 |
| | (B) | B-1 | | | | | | 25 | 25 |
| | | B-2 | | | | | | | |
| | | B-3 | | | | | | | |

TABLE 2-continued

|  |  |  |  | | | | | | | |
|---|---|---|---|---|---|---|---|---|---|---|
| | | | B-4 | 10 | | | | | | |
| | | | B-5 | | 10 | | | | | |
| | (C) | Azodicarbonamide (ADCA) | | 6 | 8 | 5.6 | 4.8 | 3.4 | 6 | 6 |
| | (D) | Dicumyl peroxide (DCP) | | 0.7 | 0.7 | 0.7 | 0.7 | 0.7 | 0.7 | 0.2 |
| Physical properties (150% compressed product) | (i) | Average specific gravity | | 0.1 | 0.1 | 0.09 | 0.1 | 0.15 | 0.1 | 0.1 |
| | | Difference between the maximum value and the minimum value of measured specific gravity values | | 0.03 | 0.03 | 0.02 | 0.02 | 0.03 | 0.14 | 0.04 |
| | (iii) | Impact resilience | (cm) | 44 | 44 | 47 | 48 | 42 | Cannot sampled due to nonuniform foaming | 48 |
| | (iv) | Tearing strength | (N/mm) | 2.2 | 2.2 | 1.9 | 2.4 | 3.3 | | 2.2 |
| | (v) | Asker C hardness | | 56 | 55 | 49 | 53 | 65 | | 55 |
| | (ii) | Compression permanent strain (CS) | % | 53.5 | 59.3 | 82 | 76 | 63 | | 74 |
| | −279 × (average specific gravity) + 95 | | | 66.5 | 66 | 71.3 | 66.5 | 53.4 | | 66.8 |

The invention claimed is:

1. A foam obtained by foaming an olefin polmer wherein the foam has a specific gravity (d) in the range of 0.03 to 0.30, and a compression sct (CS, %) and the specific gravity (d) satisfies the following formula:

$$CS \leq -279 \times (d) + 95;$$

and
wherein the foam is obtained by heating an ethylene polymer composition comprising an ethylene polymer (A) in an amount of 85 mass % to 93 mass % and an ethylene/propylene/non-conjugated polyene copolymer (13) in an amount of 7 mass % to 15 mass % (the sum of (A) and (B) is 100 mass %) and a azodicarbonamide (C) in an amount of 5 to 6 parts by mass relative to the total 100 parts by mass of the olefin polymers,
wherein the non-conjugated polyene is 5-ethylidene-2-norbornene and/or 5-vinyl-2-norbornene:
the component (A) comprising (A1) an ethylene/1-butene copolymer in which (a1) a density (ASTM D1505, 23° C.) is in the range of 0.857 to 0.910 g/cm$^3$ and (a2) a melt flow rate (MFR2) (ASTM D1238, a load of 2.16 kg, 190° C.) is in the range of 0.1 to 40 g/10 minutes at a load of 2.16 kg and at 190° C.; and
the component (B) satisfying the conditions in which (b1) a ratio (Et/α) of a content (Et, mole %) of constitutional units derived from ethylene and a content (α, mole %) of constitutional units derived from propylene is in the range of 50/50 to 80/20, (b2) an iodine value is in the range of 0.5 to 50 (g/100 g), and (b3) a Mooney viscosity (ML$_{1+4}$ (100° C.)) (JIS K6395) is in the range of 1 to 100.

2. The foam according to claim 1, wherein the foam is a crosslinked foam.

3. A laminate comprising:
a layer comprising the foam according to claim 1; and
a layer comprising at least one material selected from the group consisting of polyolefin, polyurethane, rubber, leather and synthetic leather.

4. Footwear comprising the foam according to claim 1.

5. A footwear component comprising the foam according to claim 1.

6. The footwear component according to claim 5, which is a mid sole, an inner sole or a sole.

7. A laminate comprising:
a layer comprising the foam according to claim 2; and
a layer comprising at least one material selected from the group consisting of polyolefin, polyurethane, rubber, leather and synthetic leather.

8. Footwear comprising the foam according to claim 2.

9. Footwear comprising the laminate according to claim 3.

10. Footwear comprising the laminate according to claim 7.

11. A footwear component comprising the foam according to claim 2.

12. A footwear component comprising the laminate according to claim 3.

13. A footwear component comprising the laminate according to claim 7.

14. The footwear component according to claim 11, which is a mid sole, an inner sole or a sole.

15. The footwear component according to claim 12, which is a mid sole, an inner sole or a sole.

16. The footwear component according to claim 13, which is a mid sole, an inner sole or a sole.

* * * * *